(12) United States Patent
Weng et al.

(10) Patent No.: US 8,645,720 B2
(45) Date of Patent: Feb. 4, 2014

(54) POWER ADAPTOR DETECTION SYSTEM

(75) Inventors: So-Yu Weng, Sijhih (TW); Hsien Tsung Lin, Shin-Chaung (TW)

(73) Assignee: Dell Products L.P., Round Rock, TX (US)

( * ) Notice: Subject to any disclaimer, the term of this patent is extended or adjusted under 35 U.S.C. 154(b) by 645 days.

(21) Appl. No.: 12/690,157

(22) Filed: Jan. 20, 2010

(65) Prior Publication Data

US 2011/0179291 A1   Jul. 21, 2011

(51) Int. Cl.
*G06F 1/26*   (2006.01)

(52) U.S. Cl.
USPC ............................. 713/300; 713/310; 713/340

(58) Field of Classification Search
USPC .......................................... 713/300, 310, 340
See application file for complete search history.

(56) References Cited

U.S. PATENT DOCUMENTS

| | | | |
|---|---|---|---|
| 5,506,490 A * | 4/1996 | DeMuro | 320/106 |
| 6,928,568 B2 | 8/2005 | Breen et al. | |
| 7,392,410 B2 | 6/2008 | Allen et al. | |
| 2004/0018774 A1 * | 1/2004 | Long et al. | 439/620 |
| 2006/0103996 A1 * | 5/2006 | Carroll et al. | 361/90 |

* cited by examiner

*Primary Examiner* — Paul Yanchus, III
(74) *Attorney, Agent, or Firm* — Haynes and Boone, LLP

(57) ABSTRACT

A power adaptor detection system includes a power adaptor device configured to receive electrical power at a first voltage and to convert the electrical power to a second voltage. The second voltage has a lower value than the first voltage. An identification generating circuit is coupled to the power adaptor device. The identification generating circuit is configured to convert a portion of the electrical power to a substantially constant value electrical current. An identification detection circuit is configured to detect the second voltage. Detecting the second voltage causes the identification circuit to determine the value of a pulse of the electrical current, wherein the value of the electrical current is an identification attribute of the power adaptor device.

20 Claims, 5 Drawing Sheets

Fig. 5

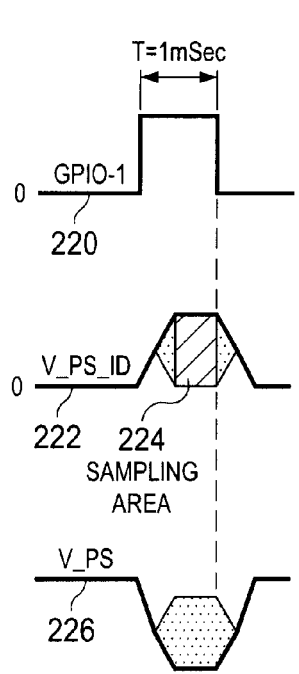

| Isn [mA] | V_PS_ID [V] | CORRESPONDING ADAPTOR'S POWER-RATING [WATT] | NOTES |
|---|---|---|---|
| 1.000 | 0.100 | 5 | BELOW 100W, 5W/STEP |
| 1.100 | 0.110 | 10 | BELOW 100W, 5W/STEP |
| 1.210 | 0.121 | 15 | BELOW 100W, 5W/STEP |
| 1.331 | 0.133 | 20 | BELOW 100W, 5W/STEP |
| 1.464 | 0.146 | 25 | BELOW 100W, 5W/STEP |
| 1.611 | 0.161 | 30 | BELOW 100W, 5W/STEP |
| 1.772 | 0.177 | 35 | BELOW 100W, 5W/STEP |
| 1.949 | 0.195 | 40 | BELOW 100W, 5W/STEP |
| 2.144 | 0.214 | 45 | BELOW 100W, 5W/STEP |
| 2.358 | 0.236 | 50 | BELOW 100W, 5W/STEP |
| 2.594 | 0.259 | 55 | BELOW 100W, 5W/STEP |
| 2.853 | 0.285 | 60 | BELOW 100W, 5W/STEP |
| 3.138 | 0.314 | 65 | BELOW 100W, 5W/STEP |
| 3.452 | 0.345 | 70 | BELOW 100W, 5W/STEP |
| 3.797 | 0.380 | 75 | BELOW 100W, 5W/STEP |
| 4.177 | 0.418 | 80 | BELOW 100W, 5W/STEP |
| 4.595 | 0.459 | 85 | BELOW 100W, 5W/STEP |
| 5.054 | 0.505 | 90 | BELOW 100W, 5W/STEP |
| 5.560 | 0.556 | 95 | BELOW 100W, 5W/STEP |
| 6.116 | 0.612 | 100 | BELOW 100W, 5W/STEP |
| 6.727 | 0.673 | 110 | ABOVE 100W, 10W/STEP |
| 7.400 | 0.740 | 120 | ABOVE 100W, 10W/STEP |
| 8.140 | 0.814 | 130 | ABOVE 100W, 10W/STEP |
| 8.954 | 0.895 | 140 | ABOVE 100W, 10W/STEP |
| 9.850 | 0.985 | 150 | ABOVE 100W, 10W/STEP |
| 10.835 | 1.083 | 160 | ABOVE 100W, 10W/STEP |
| 11.918 | 1.192 | 170 | ABOVE 100W, 10W/STEP |
| 13.110 | 1.311 | 180 | ABOVE 100W, 10W/STEP |
| 14.421 | 1.442 | 190 | ABOVE 100W, 10W/STEP |
| 15.863 | 1.586 | 200 | ABOVE 100W, 10W/STEP |
| 17.449 | 1.745 | 210 | ABOVE 100W, 10W/STEP |
| 19.194 | 1.919 | 220 | ABOVE 100W, 10W/STEP |
| 21.114 | 2.111 | 230 | ABOVE 100W, 10W/STEP |
| 23.225 | 2.323 | 240 | ABOVE 100W, 10W/STEP |
| 25.548 | 2.555 | 250 | ABOVE 100W, 10W/STEP |
| 28.102 | 2.810 | 260 | ABOVE 100W, 10W/STEP |
| 30.913 | 3.091 | 270 | ABOVE 100W, 10W/STEP |
| 34.004 | 3.400 | 280 | ABOVE 100W, 10W/STEP |
| 37.404 | 3.740 | 290 | ABOVE 100W, 10W/STEP |
| 41.145 | 4.114 | 300 | ABOVE 100W, 10W/STEP |
| ... | ... | ... | ... |

POWER ADAPTOR DETECTION SYSTEM

BACKGROUND

The present disclosure relates generally to information handling systems (IHSs), and more particularly to a power adaptor detection system for an IHS.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs, such as portable IHSs, use power adaptor identification (PSID) signals to communicate to the IHS one or more attributes of the power adaptor, such as the power adaptor's power rating, manufacturer, or a variety of other attributes. Typically, PSID type power adaptor devices deliver the adaptor's information to the IHS's basic input-output system (BIOS) for configuring an input power control circuit (IPCC) and also for configuring a total power configuration for the IHS. The PSID signals are generally provided to the IHS using a dedicated communication cable. Generally, this dedicated communication cable is packaged in the same cable assembly with the electrical power cables, but it is electrically insulated from the power cables.

This type of PSID power adaptor system traditionally, has a memory device inside of the PSID power adaptor to provide the identification information for the power adaptor to the IHS. Accordingly, having the memory device in the power adaptor increases the power adaptor's cost and may require a programming step for programming the information into the memory device.

Accordingly, it would be desirable to provide an improved power adaptor detection system for an IHS.

SUMMARY

According to one embodiment, a power adaptor detection system includes a power adaptor device configured to receive electrical power at a first voltage and to convert the electrical power to a second voltage. The second voltage has a lower value than the first voltage. An identification generating circuit is coupled to the power adaptor device. The identification generating circuit is configured to convert a portion of the electrical power to a substantially constant value electrical current. An identification detection circuit is configured to detect the second voltage. Detecting the second voltage causes the identification circuit to determine the value of a pulse of the electrical current, wherein the value of the electrical current is an identification attribute of the power adaptor device.

BRIEF DESCRIPTION OF THE DRAWINGS

FIG. 5 illustrates embodiments of sampling waveforms and a power adapter look-up table for the PSID systems of FIGS. 1-4.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
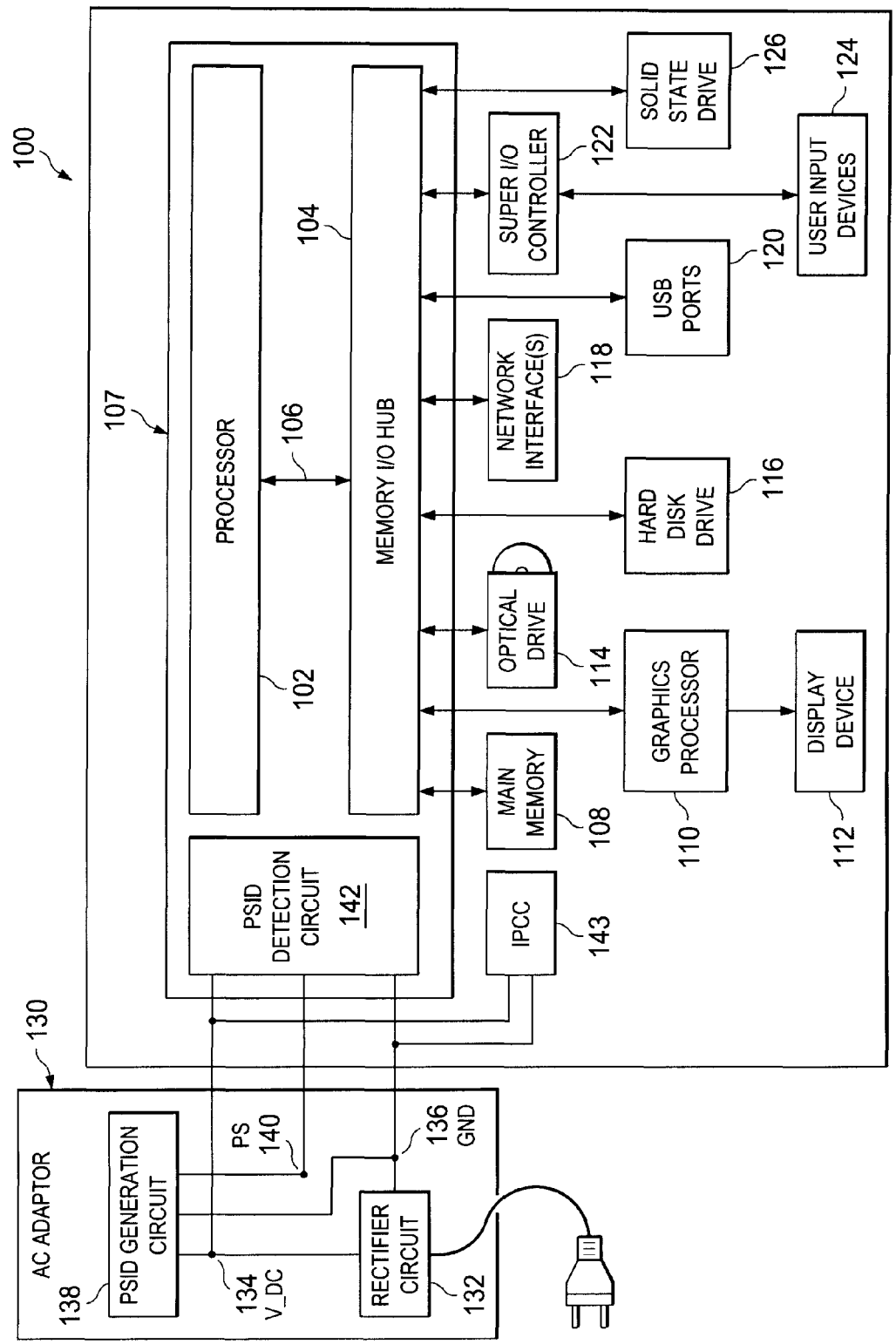
FIG. 1 illustrates an embodiment of an information handling system (IHS) coupled to a power supply identification (PSID) AC power adaptor.

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. The processor 102 and the memory I/O hub chipset 104 are included on a motherboard 107. In the alternative, the processor 102 and the I/O hub chipset 104 may be on different integrated circuit devices. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

FIG. 1 also illustrates an embodiment of the IHS 100 coupled to a power supply AC power adaptor. The power adaptor 130 is a power supply identification (PSID) power adaptor capable of communicating with the IHS 100 to inform the IHS 100 of identification attributes for the power adaptor 130. For example, the power adaptor 130 may inform the IHS 100 about the power adaptor's power rating, manufacturer, specifications, and/or a variety of other attributes about the power adaptor 130. Using the identification attributes of the power adaptor 130, the IHS can create a power configuration, such as an input power control circuit (IPCC) 143 that corresponds with the power adaptor 130.

The power adaptor 130 receives alternating current (AC) electrical power, such as through a plug-in power cord that is configured to be plugged into a power outlet, and converts this AC power to direct current (DC) power using a rectifier circuit 132. The rectifier circuit 132 includes a voltage transformation device, such as a transformer, to convert the electrical power from one voltage value to a different voltage value. For example, the rectifier circuit 132 may receive 100-240 VAC electrical power at 50-60 Hz and convert that to approximately 19.5 VDC. However, it is understood that the rectifier circuit and the power adaptor 130 may receive different values of electrical power and may also output different values of electrical power. Output nodes for the rectifier circuit 132 are the V_DC node 134 and the GND node 136. The V_DC node 134 is an electrical node where the +DC voltage, with respect to the GDN node 136, is provided from the rectifier circuit 132 to the IHS 100.

The rectifier circuit 132 electrically couples to a PSID generation circuit 138 at the V_DC node 134. The PSID generation circuit 138 generates a signal that corresponds to one or more identification attributes for the adaptor 130. It is to be understood that the generation circuit 138 may generate any number and any type of communication signal to communicate the identification attributes from the adaptor 130 to the IHS 100. The output of the PSID generation circuit 138 is provided at PS signal node 140.

The electrical power is provided to the IHS 100 via the V_DC node 134 and the GND node 136. These nodes 134 and 136 are coupled to an electrical input plug/socket (not shown) for the IHS 100 using insulated electrical conductors. In the alternative, the IHS 100 may be powered by a battery or other type of power source. A PSID detection circuit 142 in the IHS 100 detects that the adaptor 130 is coupled to the IHS 100 and then samples the signal provided at the PS node 140 to determine an identity (e.g., one or more identifying attributes about the adaptor 130) so that the IHS 100 may use this identity to configure electrical input circuitry, such as the IPCC 143 for an optimized use of the adaptor 130 by the IHS 100. In an embodiment, the electrical signals from the V_DC node 134, the GND node 136 and the PS signal node 140 are electrically insulated from one another and provided to the IHS 100 in a conductor cable assembly.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Figure 2:
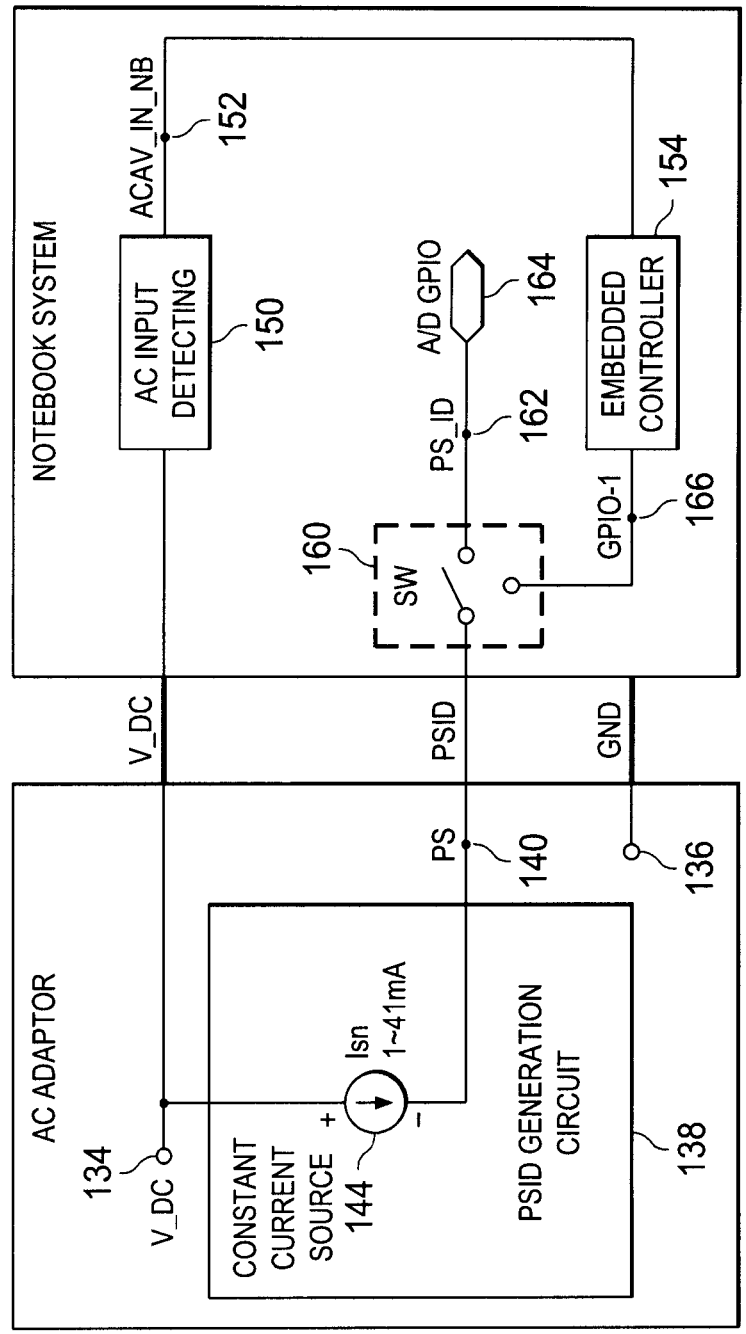
FIG. 2 illustrates a block diagram of an embodiment of a PSID generation circuit of the power adaptor coupled to a PSID detection circuit of the IHS of FIG. 1.

FIG. 2 illustrates a block diagram of an embodiment of the PSID generation circuit 138 of the power adaptor 130 coupled to the PSID detection circuit 142 of the IHS 100. As shown, the PSID generation circuit 138 couples to the V_DC node 134 to receive electrical power. The PSID generation circuit 138 operates as a constant current source 144 and outputs an identification signal (e.g., a constant current) at PS signal node 140. In an embodiment, the current source 144 operates providing a current in the range of 1-41 mA. However, other current values may be produced by the current source 144. Accordingly, the power adaptor 130 is coupled to the IHS 133 at the V_DC node 134, the GND node 136 and the PS signal node 140 when the power adaptor's cable is plugged into or otherwise coupled with the power input node of the IHS 100. The identification constant current signal should remain substantially constant, such as having a value that stays within a 10% range of value. Different power adaptors 130 will provide a different current value at the PS signal node 140. Therefore, the IHS can determine the value of the current at the PS signal node and thus, determine an identification of the power adaptor 130. Examples of possible different values at the PS signal node 140 are found in FIG. 5, which is explained in more detail below.

FIG. 2 also illustrates a block diagram of the PSID detection circuit. The PSID detection circuit 142 includes an input detection circuit 150 that receives the electrical signal from the power adaptor 130 at the V_DC node 134. Upon receiving the signal at the V_DC node 134, the input detection circuit 150 outputs a signal at the ACAV_IN_NB node 152 indicating that the IHS 100 is receiving electrical power from the power adaptor 130. An embedded controller 154 receives the signal at the ACAV_IN_NB node 152.

The identification signal generated by the PSID generation circuit 138 of the Power adaptor 130 at the PS signal node 140 is received by the IHS 100 at a switch 160. The switch 160 is an electronic MOSFET type switch system. However, in the alternative, other types of electronic or electro-mechanical switches may be used for switch 160. The switch 160 selectively passes the identification signal at the PS signal node 140 to a PS_ID node 162 where it is received by a general purpose input/output (GPIO), such as the analog-to-digital (A/D) GPIO 164. Receiving the signal at the PS_ID node 162 by the GPIO 164 allows a system, such as the basic input/output system (BIOS) to perform a query using a look-up table, such as the table 228 shown in FIG. 5, to identify the power adaptor 130 by the value of the signal (e.g., the current value) at the PS_ID node 162.

Using the input detection circuit 150 outputting the a signal at the ACAV_IN_NB node 152 allows the embedded controller 154 to trigger the switch 160 to pass a pulse of the signal on the PS signal node 140 to the PS_ID node 162. An embodiment of sample waveforms are found in FIG. 5. When the embedded controller 154 receives a signal at the ACAV_IN_NB node 152, the embedded controller 154 provides a pulse output at the GPIO-1 node 166. An embodiment of this pulse output can be seen as the waveform 220 in FIG. 5. In an embodiment, the pulse is for a duration of approximately 1 second, but other times may also be used. When the GPIO-1 node 166 is a logic high (e.g. logic 1), the switch 160 passes the signal from the PS signal node 140 to the PS_ID node 162. Accordingly, the GPIO 164 receives the signal at the PS-ID node and can use that information to determine the identification of the power adaptor 130. For example, if the current Isn at the current source 144 passes through the switch 160 to the GPIO 164 and has a value of approximately 5.054 mA (or within 10% of 5.054 mA), the IHS 100 will use the BIOS to determine that the power adaptor 130 is a 90 Watt rated power adaptor. See table 228 of FIG. 5 for more examples of how current indicates power adaptor power rating in the look-up table.

Figure 3:
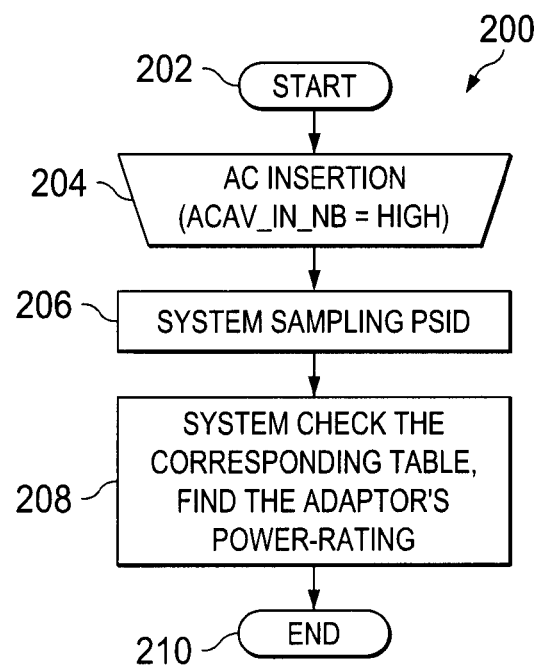
FIG. 3 illustrates a flow chart of an embodiment of a method for power adapter detection using the PSID system shown in FIG. 2.

FIG. 3 illustrates a flow chart of an embodiment of a method 200 for power adapter detection using the PSID system shown in FIG. 2. The method 200 starts at block 202. The method 200 proceeds to block 204 when the power adaptor 130 is plugged into the IHS 100, thereby providing electrical power to the IHS from the power adaptor 130. Upon determining that the input is detected at the input detection circuit 150, the detection circuit 150 provides a digital 1 or logic high output at the ACAV_IN_NB node 152 as described above with respect to FIG. 2. The method 200 then proceeds to block 206 where the method 200 samples the PSID signal at the PS_ID node 162 using the GPIO 164. The method 200 then proceeds to block 208 where the method 200 checks the look-up table (e.g., the look-up table 228 of FIG. 5) to determine the power adaptor's identification attribute, such as the power adaptor's power rating. The method 200 ends at block 210. It is to be understood that other steps may be performed before, during and after the ones shown in the method 200 of FIG. 3. For example, the IHS 100 may use the identification attribute determined in the method 200 to determine a power configuration setting, for operating one or more circuits of the IHS 100, such as the input power control circuit (IPCC) 143.

Figure 4:
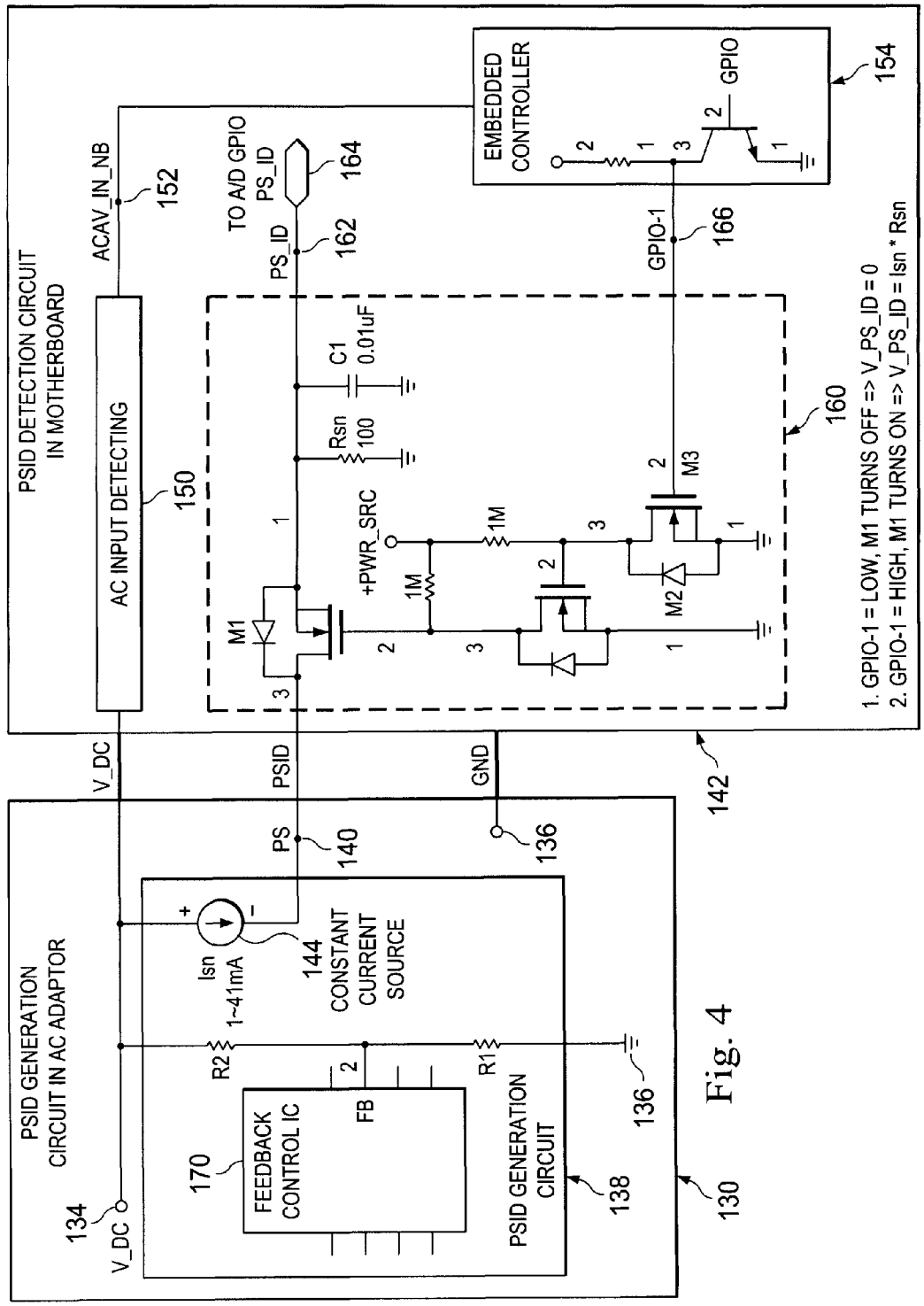
FIG. 4 illustrates a schematic diagram of an embodiment of the PSID generation circuit of the power adaptor coupled to the PSID detection circuit of FIG. 2.

FIG. 4 illustrates a schematic diagram of an embodiment of the PSID generation circuit 138 of the power adaptor 130 coupled to the PSID detection circuit 142 of the IHS 100. The PSID generation circuit 138 operates as discussed above however, in this embodiment, a feedback control integrated circuit 170 is coupled between the V_DC node 134 and the GND node 136 using resistors R1 and R2. FIG. 4 also illustrates a schematic diagram of an embodiment of the switch 160. Switch 160, in this embodiment utilizes a circuit having a variety of components such as resistors, MOSFET switches and a capacitor to perform the function of the switch 160 as discussed above. The operation of the circuits shown in FIG. 4 should be readily understood by those having ordinary skill in the art. Additionally, specific values for components shown in the schematics of FIG. 4 may be varied to cause the system to perform as desired. In an embodiment, the operation of the circuits shown in the power adaptor 130 and the PSID detection circuit 142 of FIG. 4 are illustrated using the GPIO-1 waveform 220, the V_PS_ID waveform 222, the sampling area 224 and the VPS waveform 226 as shown in FIG. 5. Accordingly, when the GPIO-1 node 166 is a logic low, the M1 switch turns off and the V_PS_ID (e.g., the voltage at PS_ID node 162)=0. On the other hand, when the GPIO-1 node 166 is a logic high, the M1 switch turns on and the V_PS_ID (e.g., the voltage at PS_ID node 162)=Isn×Rsn.

FIG. 5 illustrates embodiments of sampling waveforms and a power adapter look-up table for the PSID systems of FIGS. 1-4. Accordingly, as described above, a system, such as a BIOS system, can read the value provide at the GPIO 164 shown in FIGS. 2 and 4 to query a look-up table, such as the look-up table 228, to determine an identification attribute of the power adaptor 130.

As should be understood, the present disclosure provides an embodiment of a system for detecting a power adaptor's (e.g., an AC power adaptor's) identification attribute (e.g., power-rating) using a PSID system. As described and shown in the figures, an embodiment of the present disclosure provides a constant-current source on the adaptor side and a pulse-sampling circuit and an A/D GPIO on the IHS side to accomplish identification of the adaptor.

A constant-current in adaptor side delivers a signal that corresponds to the adaptor's power-rating, as shown in FIG. 5. In an embodiment, the constant-current flows to the IHS through a PSID pin. In an embodiment, the sampling circuit is configured as a pulse-sampling circuit. As should be understood with respect to FIG. 4, the voltage of V_PS_ID is transformed form the constant-current Isn by passing through a resistor Rsn, within a certain period of time. A pulse-sampling circuit on the IHS side controls the sampling period. An ND GPIO on the IHS side is used to detect the voltage of V_PS_ID, and then convert that to a digital signal for use by the system BIOS for querying the look-up table. In the alternative, an embodiment may provide for random detection of the identification attributes of the power adaptor. In this random embodiment, there is not a need to align the timing between the power adaptor and the IHS detection system.

As an example, using a 90 W power adaptor provides operation where a constant-current is formed inside of an adaptor when the adaptor is plugged into the AC power outlet. The constant-current will not leak from the adaptor if it is disconnected from the IHS. As shown in the embodiment of the look-up table of FIG. 5, the constant current for a 90 watts power adaptor is approximately 5.054 milli-Amperes. Plugging the adaptor into the IHS causes the ACAV_IN_NB node 152 to go to a logic high. The system sends a detecting pulse signal for a time period (e.g., a milli-second) at the GPIO-1 node 166. During the sampling area time 224, shown in FIG. 5, the V_PS_ID reaches approximately 0.505 volts. This may be converted by an A/D GPIO to the system/BIOS. The system BIOS then receives the corresponding adaptor power-rating as seen on the table 228 of FIG. 5. It should be understood that other values may be used with the disclosed systems.

Accordingly it is to be understood that an embodiment of the present disclosure provides a constant-current in a power adaptor, wherein the current value corresponding to the AC-adaptor's power-rating. An embodiment provides a pulse sampling circuit on the IHS side, which uses an A/D GPIO. And, an embodiment provides a corresponding look-up table on the system BIOS of the IHS having at least 40 categories of the power-rating that can be recognized by the IHS based on this table. There may be a 10% tolerance between any two levels on the look-up table. As should be understood, the look-up table can be expanded lower than 5 W or higher than 300 W.

Certain features, benefits and advantages of the present disclosure may include a wide range power rating detection, resistor setting for the power adaptor (e.g., memory not required in the power adaptor), resulting in less simple development and manufacturing of the power adaptor, and lower costs. Other features, benefits and advantages should be readily understood.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system, comprising:
   a power adaptor device that receives electrical power at a first voltage, converts the electrical power to a second voltage, and outputs the second voltage to a power connection, wherein the second voltage has a lower value than the first voltage;
   an identification generating circuit that is coupled to the power adaptor device and that converts a portion of the electrical power to a substantially constant value electrical current and outputs the substantially constant value electrical current to a data connection; and an identification detection circuit including a controller that detects the second voltage through the power connection and, in response, opens a switch coupled to the identification generation circuit through the data connection to provide a pulse of the substantially constant value electrical current to a resistor for a time period such that a voltage is produced, wherein a processor converts the voltage to a digital signal that is compared to a table to determine a power rating of the power adaptor device.

2. The system of claim 1, wherein the first voltage is AC and the second voltage is DC.

3. The system of claim 1, wherein the value of the substantially constant value electrical current is constant within a 10% variance.

4. The system of claim 1, wherein the digital signal is compared to the table to determines an operating instruction for the power adaptor device.

5. The system of claim 1, wherein the switch provides the pulse of the substantially constant value electrical current to the resistor such that the voltage is produced and an analog-to-digital (A/D) general purpose input/output (GPIO) on the processor converts that voltage to the digital signal.

6. The system of claim 1, wherein the table includes a plurality of different voltage values that each correspond to a respective power rating of a power adaptor device and an operating instruction for that power adapter device.

7. The system of claim 1, wherein the processor uses the power rating of the power adaptor device to configure an input power control circuit (IPCC).

8. An Information handling system (IHS), comprising:
a processor;
a memory device coupled to the processor;
a power adaptor device that is operable to couple to the processor and the memory device, the power adaptor device comprising:
  a converter circuit that is operable to receive electrical power at a first voltage, convert the electrical power to a second voltage, and output the second voltage to a power connection, wherein the second voltage has a lower value than the first voltage; and
  an identification generation circuit that is operable to convert a portion of the electrical power to a substantially constant value electrical current and output the substantially constant electrical current to a data connection; and
  an identification detection circuit that includes a controller that is operable to detect the second voltage provided by the power adapter device through the second power connection when the power adapter device is coupled to the processor and the memory and, in response, open a switch coupled to the identification generation circuit through the data connection to provide a pulse of the substantially constant value electrical current to a resistor for a time period such that a voltage is produced, wherein the processor is operable to convert the voltage to a digital signal that is compared to a table to determine a power rating of the power adaptor device.

9. The IHS of claim 8, wherein the first voltage is AC and the second voltage is DC.

10. The IHS of claim 8, wherein the value of the substantially constant value electrical current is constant within a 10% variance.

11. The IHS of claim 8, wherein the digital signal is compared to the table to determine an operating instruction for the power adaptor device.

12. The IHS of claim 8, wherein the switch provides the pulse of the substantially constant value electrical current to the resistor such that the voltage is produced and an analog-to-digital (A/D) general purpose input/output (GPIO) on the processor converts that voltage to the digital signal.

13. The IHS of claim 8, wherein the table includes a plurality of different voltage values that each correspond to a respective power rating of a power adaptor device and an operating instruction for that power adapter device.

14. The IHS of claim 8, wherein the processor is operable to use the power rating of the power adaptor device to configure an input power control circuit (IPCC).

15. A method, comprising:
receiving electrical power at a first voltage at a power adaptor device and converting the electrical power, using the power adapter device, to second voltage that is lower than the first voltage;
providing the second voltage from the power adapter device to a power connection;
converting a portion of the electrical power to a substantially constant value electrical current using the power adapter device;
providing the substantially constant value electrical current from the power adapter device to a data connection;
detecting the supplying of second voltage from the power adaptor device to an information handling system (IHS) through the power connection;
in response to detecting the supplying of second voltage from the power adapter device to the IHS through the power connection, opening a switch to provide a pulse of the substantially constant value electrical current through the data connection to a resistor for a time period such that a voltage is produced; and
converting the voltage to a digital signal and comparing the digital signal to a table using a processor to determine a power rating of the power adaptor device.

16. The method of claim 15, wherein a value of the substantially constant electrical current is constant within a 10% variance.

17. The method of claim 15, further comprising:
comparing the digital signal to the table using the processor to determine an operating instruction for the power adaptor device.

18. The method of claim 17, further comprising:
converting the voltage to the digital signal using an analog-to-digital (A/D) general purpose input/output (GPIO) on the processor.

19. The method of claim 18, wherein the table includes a plurality of different voltage values that each correspond to a respective power rating of a power adaptor device and an operating instruction for that power adapter device.

20. The method of claim 15, further comprising:
configuring an input power control circuit (IPCC) for the IHS using the power rating of the power adaptor device.

* * * * *